United States Patent [19]
Greve et al.

[11] Patent Number: 5,978,418
[45] Date of Patent: Nov. 2, 1999

[54] INCREASED ACCURACY AND RESOLUTION FOR OPTIC POSITION SENSORS

[75] Inventors: James E. Greve, South Bend; Ted B. Gilbert, Osceola; Jeffery S. Gustus, South Bend, all of Ind.

[73] Assignee: AlliedSignal Inc.

[21] Appl. No.: 08/683,925

[22] Filed: Jul. 19, 1996

[51] Int. Cl.⁶ ..................................... G01B 11/02
[52] U.S. Cl. ......................... 375/242; 356/356; 356/359
[58] Field of Search ..................... 375/369, 342, 375/316, 333, 262, 261, 260, 216; 341/90, 97, 74, 13, 68, 69, 70; 356/359, 43, 45, 136, 128, 386, 356

[56] References Cited

U.S. PATENT DOCUMENTS

| | | | |
|---|---|---|---|
| 4,223,216 | 9/1980 | Quick et al. ............................. | 250/226 |
| 4,778,270 | 10/1988 | Kinney et al. ........................... | 356/136 |
| 4,852,079 | 7/1989 | Kinney et al. ............................... | 370/3 |
| 4,857,726 | 8/1989 | Kinney et al. ........................... | 250/226 |
| 4,918,484 | 4/1990 | Ujiie et al. ................................. | 355/41 |
| 5,004,910 | 4/1991 | Arnett ..................................... | 250/226 |
| 5,170,299 | 12/1992 | Moon ................................... | 360/77.08 |
| 5,222,105 | 6/1993 | Kinney et al. ........................... | 375/333 |
| 5,334,978 | 8/1994 | Halliday .................................... | 341/94 |
| 5,856,872 | 1/1999 | Horwitz .................................. | 356/356 |

*Primary Examiner*—Chi H. Pham
*Assistant Examiner*—Emmanuel Bayard
*Attorney, Agent, or Firm*—Larry J. Palguta

[57] ABSTRACT

An optic position sensor provides a data encoding method which improves the resolution capability of the sensing system. The data pattern of the sensor comprises a series of data signals having a start bit, digital data bits, an analog bit region (12) and a stop bit. The digital data bits may be a Manchester Encoded, Gray Coded data signal pattern. The analog data bit region (12) comprises a vernier track (10) which will produce a signal peak that moves linearly with position. The detection of the position of the vernier track (10) or bit relative to its range or region (12) provides a measurement of the percent of travel that has occurred within and between the discernible resolution of the digital data bits of the data signal, to provide resolution capability of approximately one part in sixteen thousand.

16 Claims, 1 Drawing Sheet

INCREASED ACCURACY AND RESOLUTION FOR OPTIC POSITION SENSORS

STATEMENT REGARDING FEDERALLY SPONSORED RESEARCH OR DEVELOPMENT

This invention was made with Government support under Agreement No. MDA972-94-3-0014 awarded by ARPA. The Government has certain rights in the invention.

The present invention relates to fiber optic transmissions and reception of information from optical positions sensors, and more particularly to a process for providing a high resolution capability.

BACKGROUND OF THE INVENTION

Optical position sensors have been disclosed in previous patents, including Kinney et al. U.S. Pat. No. 4,857,726; Arnett U.S. Pat. No. 5,004,910; Kinney et al. U.S. Pat. No. 5,222,105; and Halliday U.S. Pat. No. 5,334,978. These prior patents provide methods and devices for the encoding and decoding of binary modulated light spectrum in order to recover encoded intelligence. Halliday U.S. Pat. No. 5,334,978 discloses a method of detecting and decoding a received Manchester Encoded, Gray Coded data word signal, and is incorporated by reference herein. The object of the present invention is to provide an improved high resolution capability for optic position sensors. The enhanced resolution capability of the position sensor is provided by analog tracks on a mask which effects a much finer measurement than that previously accomplished by a digital data bit pattern. It is the object of the present invention to provide an optic position sensor that utilizes a digital data bit pattern or word signal providing the capability of measuring or determining with high resolution the percentage or amount of travel sensed by the sensor.

BRIEF SUMMARY OF THE INVENTION

The present invention provides solutions to the above by providing a method of encoding a signal for high resolution detection and decoding of the encoded signal, comprising the steps of: providing a mask having a start bit, digital data bits, analog data bit, and stop bit; and displacing the mask to effect uniquely and continuously an output signal whereby the output signal is an encoded signal representing the displacement of the encoded mask. The invention also effects solutions to the above by providing a position sensor mask which encodes a signal and enables high resolution detection and decoding of the encoded signal, the mask comprising a start bit, digital data bits, analog data bit, and a stop bit.

DETAILED DESCRIPTION OF THE INVENTION

Figure 1:
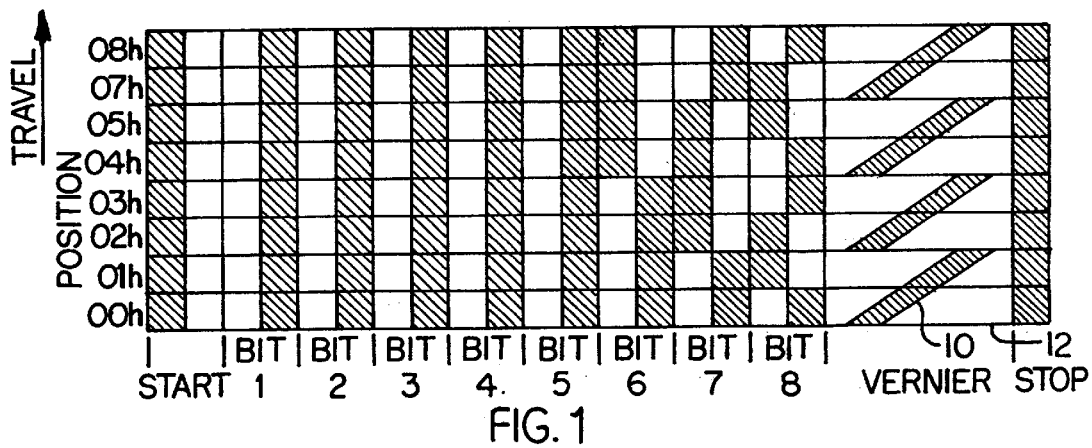
FIG. 1 is an illustration of an optic position sensor mask pattern utilized in the present invention.

FIG. 1 is a mask pattern utilized in accordance with the present invention to provide an optic position sensor with high resolution capability. The mask illustrates a vertical stack-up of digital position word signals starting with a first signal at position 00h and increasing to position 08h and beyond that for subsequent positions. Each digital data bit pattern or word signal includes along the axial axis of the graph a start bit followed by eight digital data bits, an analog or vernier track, and a stop bit. The vernier track extends axially a distance equivalent to approximately twice the width of a prior digital data bit. The digital data word signals may comprise Manchester Encoded, Gray Coded data word signals in accordance with Halliday U.S. Pat. No. 5,334,978.

Figure 2:
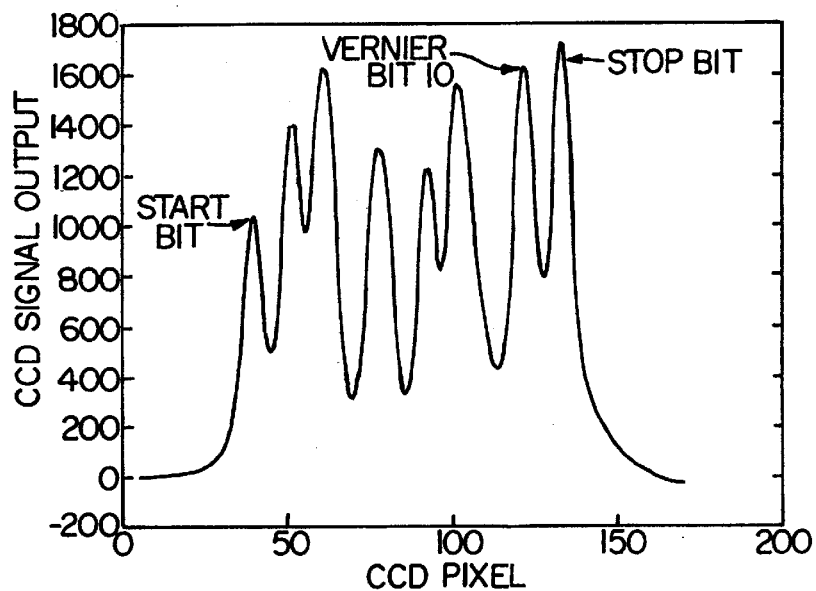
FIG. 2 is a graph of a data word signal in accordance with the present invention.
Figure 3:
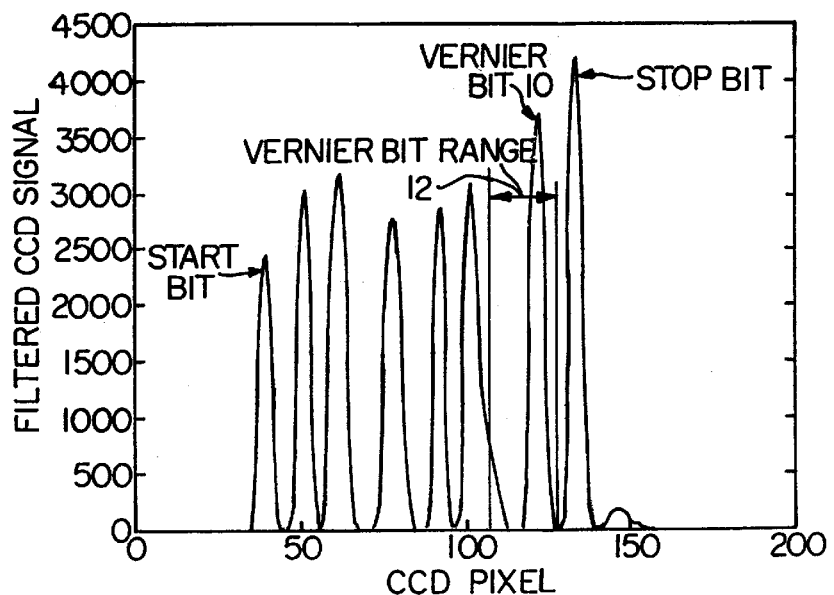
FIG. 3 is a graph of the data word signal of FIG. 2 after filtering to enhance peaks of the signal.

In order to provide a high resolution capability of the optic position sensor, the mask pattern includes the analog or vernier region 12 wherein the analog track 10 provides a continuous representation of position as the optic position sensor moves the mask from one digital data signal to the adjacent digital data signal, such as from the data word signal position 00h to the data word signal for position 01h. The analog or vernier track 10 will be imaged by a charge couple device ("CCD") spectrometer within the position sensing system to produce a signal peak in the CCD output that moves linearly with position movement, as described in Kinney et al. U.S. Pat. No. 4,857,726. The data signal illustrated in the graph of FIG. 2 shows the peaks representing the start bit, digital data bits, stop bit, and vernier bit. The output signal of the CCD spectrometer may then be filtered to enhance the peaks of the signal, as illustrated in FIG. 3, to enable accurate measurement of the positions of the start, data, stop, and vernier peaks by means of a typical differencing filter. Once the peak positions are found they are used to define the vernier bit region range 12 illustrated in FIG. 3. The ratio of the position of the vernier bit peak 10 relative to its range 12 provides a measurement of the percentage of travel that has occurred within any digital data bit or between any two adjacent data bits illustrated in FIG. 1. An example of one way to accomplish this would be the ratio of the vernier bit peak to the measurement range being determined by a software algorithm which can be executed by a microprocessor.

The result is that the position information can be encoded and decoded with a resolution of approximately one part in sixteen thousand as a result of the use of an analog or vernier track in each encoded signal. This is an improvement of approximately two orders of magnitude in the ability to measure accurately the sensed position.

We claim:

1. A position sensor mask of a high resolution position sensor having a resolution magnitude of at least $1 \times 10^{-4}$ and which encodes a signal and enables high resolution detection and decoding of the encoded signal, the mask comprising a start bit, digital data bits, analog data bit, and a stop bit.

2. The position sensor mask in accordance with claim 1, wherein the digital data bits comprise Manchester Encoded, Gray Coded data bits.

3. The position sensor mask in accordance with claim 1, wherein the analog data bit comprises a vernier track.

4. A method of encoding a signal for high resolution detection of a resolution magnitude of at least $1 \times 10^{-4}$ and decoding of the encoded signal, comprising the steps of: providing a mask having a start bit, digital data bits, analog data bit, and stop bit; and displacing the mask to effect uniquely and continuously an output signal whereby the output signal is an encoded signal representing the displacement of the encoded mask.

5. The method in accordance with claim 4, wherein the digital data bits comprise Manchester Encoded, Gray Coded data bits.

6. The method in accordance with claim 4, wherein the analog data bit comprises a vernier track.

7. A method of detecting and decoding with high resolution of a resolution magnitude of at least $1\times10^{-4}$ a received encoded signal, comprising steps of: receiving the encoded signal and detecting data bits of said signal; detecting the data bits to discern a pattern of data bits comprising a start bit, digital data bits, analog data bit, and stop bit; and determining the position of the analog data bit relative to a range of possible positions for the analog data bit to provide a measurement of the amount of travel occurring within and between the discernible resolution of the digital data bits of the encoded signal.

8. The method in accordance with claim 7, wherein the digital data bits comprise Manchester Encoded, Gray Coded data bits.

9. The method in accordance with claim 7, wherein the analog data bit comprises a vernier track.

10. The method in accordance with claim 7, further comprising the step of filtering the received encoded signal in order to enhance the ability to accurately measure the location of data bit peaks.

11. A method of signal encoding, detecting and decoding with high resolution of a resolution magnitude of at least $1\times10^{-4}$, comprising the steps of: providing a mask having a start bit, digital data bits, analog data bit, and stop bit; displacing the mask to effect uniquely and continuously an encoded signal representing the displacement of the encoded mask; receiving the encoded signal and detecting data bits of said signal; detecting the data bits to discern a pattern of data bits comprising the start bit, digital data bits, analog data bit, and stop bit; and determining the position of the analog data bit relative to a range of possible 107,005 positions for the analog data bit to provide a measurement of the amount of travel occurring within and between the discernible resolution of the digital data bits of the encoded signal.

12. The method in accordance with claim 11, wherein the digital data bits comprise Manchester Encoded, Gray Coded data bits.

13. The method in accordance with claim 11, wherein the analog data bit comprises a vernier track.

14. The method in accordance with claim 11, further comprising the step of filtering the received encoded signal in order to enhance the ability to accurately measure the location of data bit peaks.

15. The method in accordance with claim 11, wherein the method comprises an optical position sensor.

16. The method in accordance with claim 15, further comprising the steps of providing a controlled light source to illuminate a portion of the mask, and receiving the light after encoding by the mask and transmitting the encoded light to a detector for detection of the data bits.

* * * * *